(12) United States Patent
Umemura et al.

(10) Patent No.: US 8,018,090 B2
(45) Date of Patent: Sep. 13, 2011

(54) INFORMATION PROCESSING APPARATUS AND CONTROL METHOD

(75) Inventors: Naoki Umemura, Abiko (JP); Naoto Takahashi, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 149 days.

(21) Appl. No.: 12/410,619

(22) Filed: Mar. 25, 2009

(65) Prior Publication Data

US 2009/0251003 A1   Oct. 8, 2009

(30) Foreign Application Priority Data

Apr. 4, 2008 (JP) .................................. 2008-098599

(51) Int. Cl.
*H02J 3/14* (2006.01)
(52) U.S. Cl. ........................................................ 307/31
(58) Field of Classification Search .................... 307/31, 307/38, 39; 713/320
See application file for complete search history.

(56) References Cited

U.S. PATENT DOCUMENTS

| 4,451,742 A * | 5/1984 | Aswell ............................ 307/66 |
| 7,608,942 B2 * | 10/2009 | Chun et al. ...................... 307/39 |
| 7,710,063 B2 * | 5/2010 | Yoshimoto et al. ........... 318/800 |

FOREIGN PATENT DOCUMENTS

| JP | 409019085 A * | 1/1997 |
| JP | 63-261407 A | 10/1998 |

* cited by examiner

*Primary Examiner* — Albert W Paladini
(74) *Attorney, Agent, or Firm* — Canon U.S.A., Inc. IP Division

(57) ABSTRACT

An information processing apparatus selects power having a higher voltage value out of power supplied via a plurality of external apparatuses, or selects power supplied from an external apparatus via a transmission line or power supplied from a power supply, whichever has a higher voltage value, to use the selected power within the information processing apparatus.

9 Claims, 13 Drawing Sheets

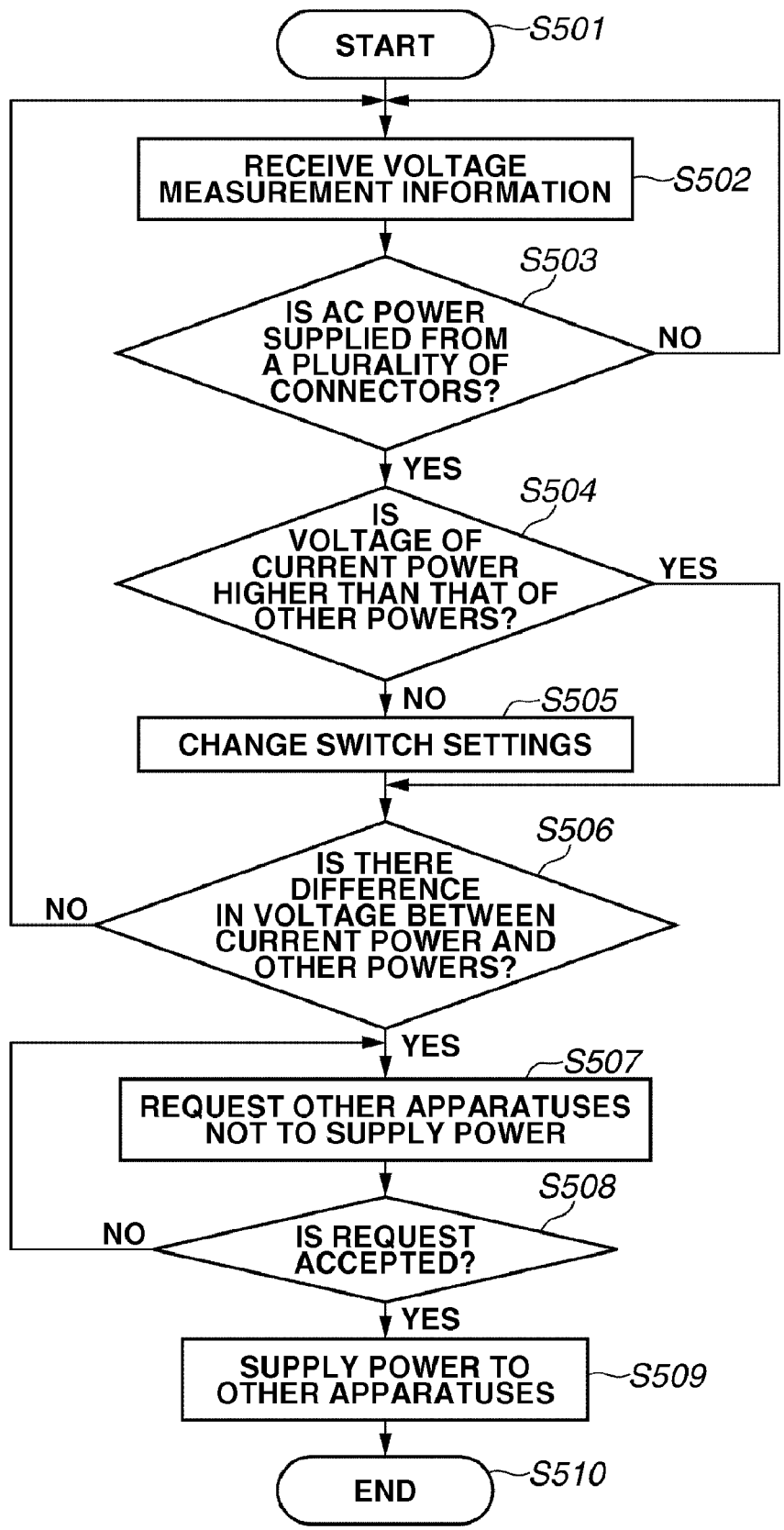

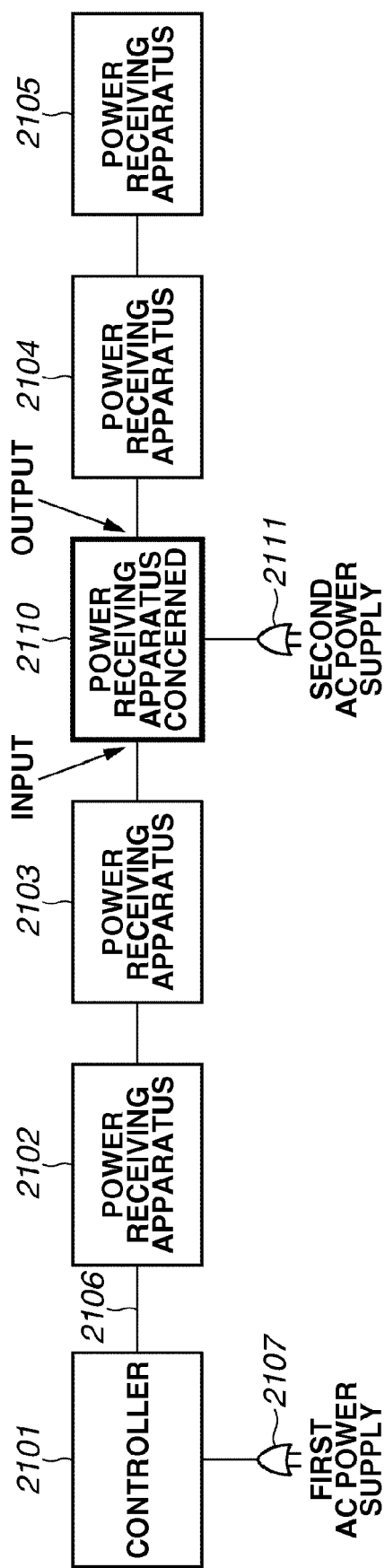

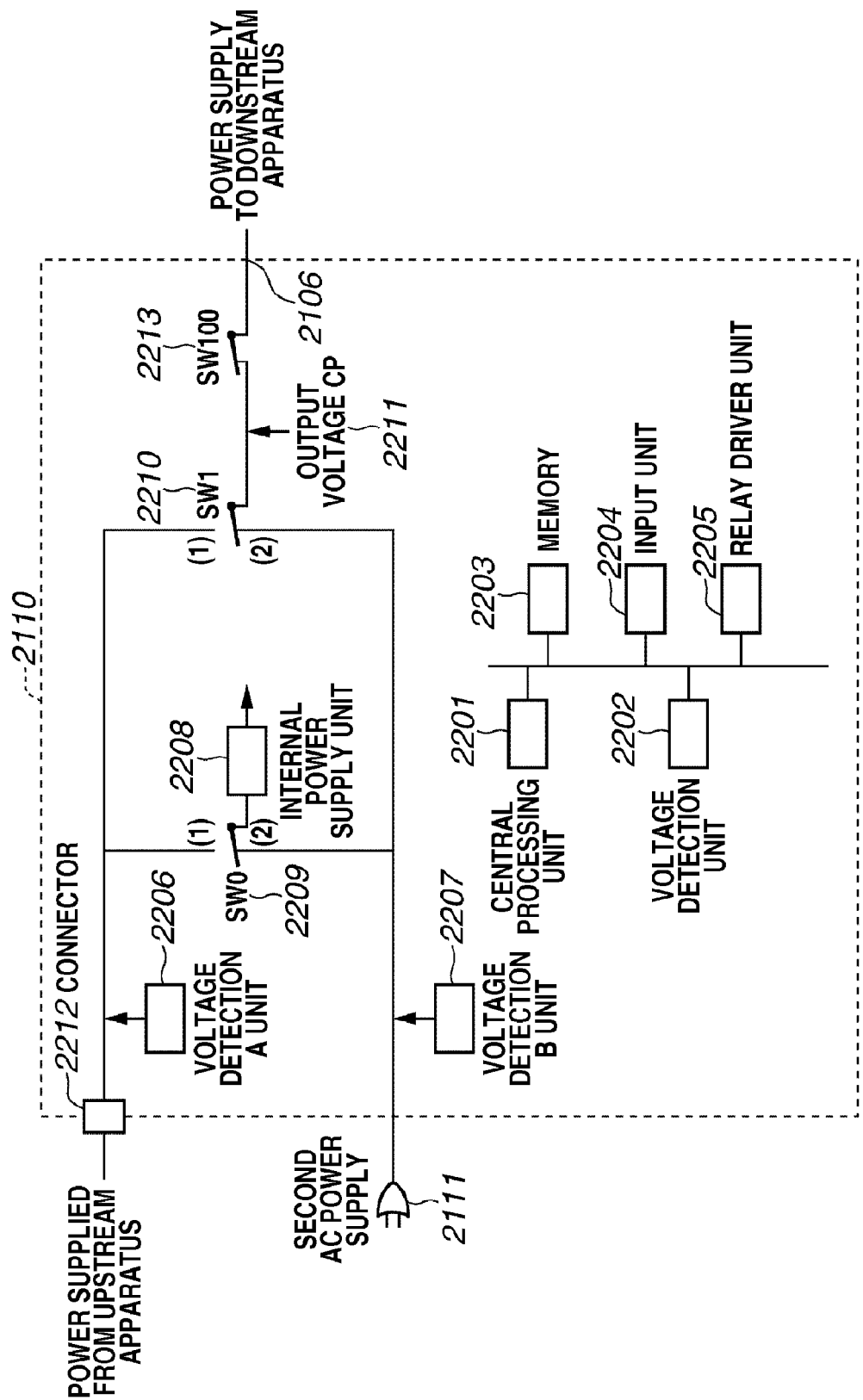

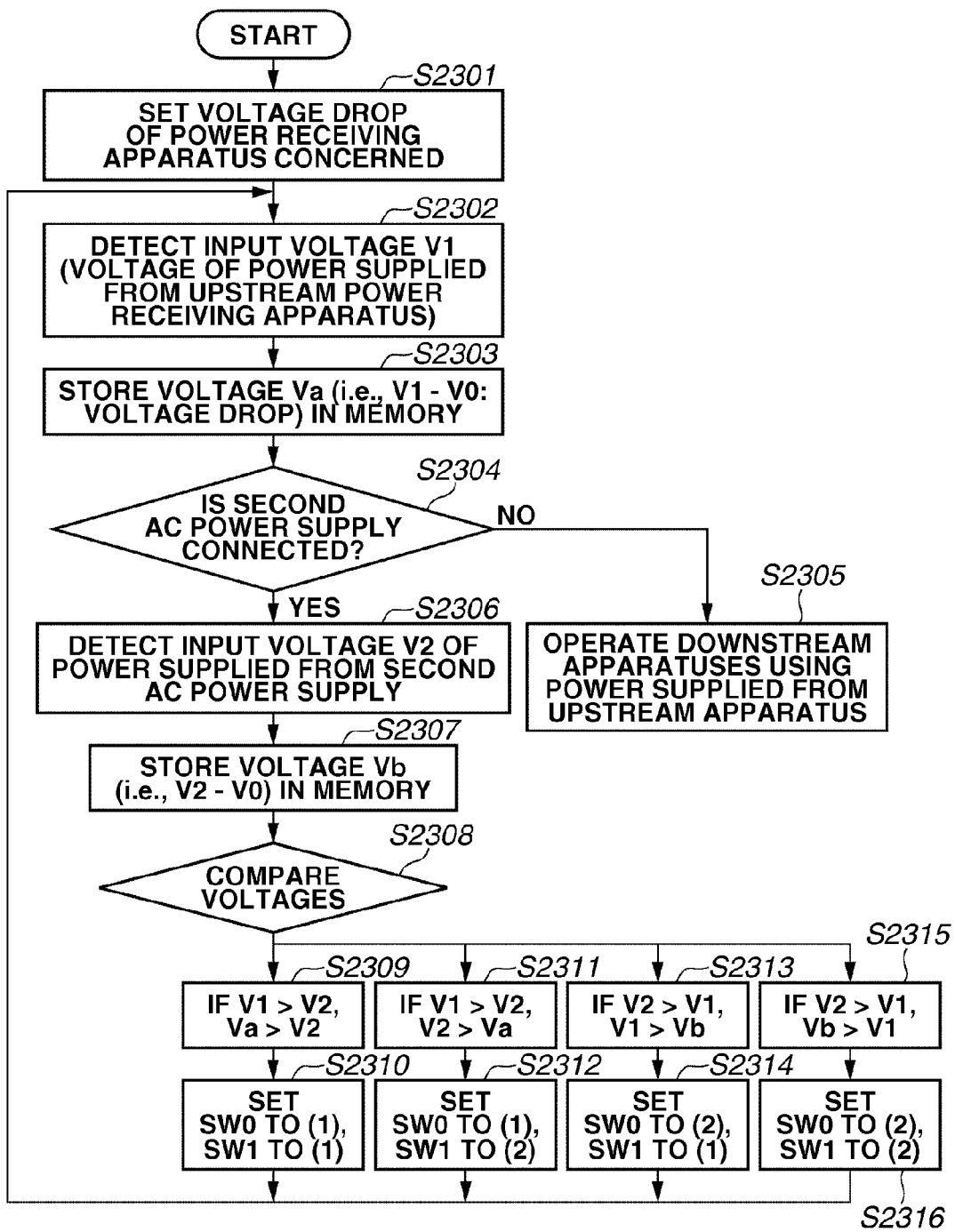

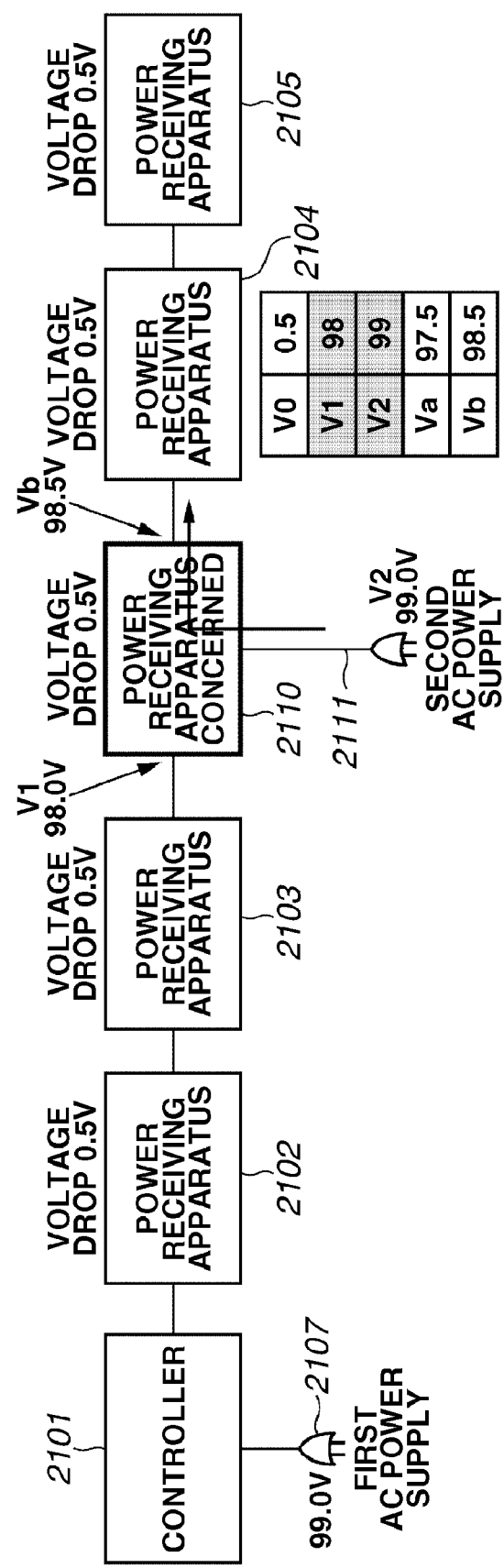

INFORMATION PROCESSING APPARATUS AND CONTROL METHOD

BACKGROUND OF THE INVENTION

1. Field of the Invention

The present invention relates to a technique which enables supply of power between apparatuses in, for example, a daisy chain connection via a transmission line.

2. Description of the Related Art

Conventionally, operation power of electrical apparatuses use alternate current (AC) power supplied from an outlet, which is then converted into direct current (DC) power by an AC adapter (AC-DC adapter) outside of each of the apparatuses or by an AC-DC converter circuit in each of the apparatuses. Further, if the supply of AC power is stopped due to a power failure or an instantaneous power interruption, the operation of the apparatus can be continued by using a system that switches the supply of power to a backup power supply (uninterruptible power supply system: UPS).

Japanese Patent Application Laid-Open No. 63-261407 discusses a method for continuously supplying high power to a system having a plurality of power supplying apparatuses. According to this method, when a power supply voltage of one of the power supplying apparatuses that supplies power to the system drops, a semiconductor switch is turned on, and power is supplied from a different power supplying apparatus that can supply power of a higher voltage.

However, the method discussed in Japanese Patent Application Laid-Open No. 63-261407 is a power switching method in which power is supplied to one apparatus from a plurality of power supplying apparatuses, and thus does not describe supply of power between a plurality of apparatuses in a system where the apparatuses are connected via a cable or the like. Considering a system where alternating current power is supplied from one apparatus to another for operation, a voltage drop of the alternating current power may occur depending on a length of the transmission. If the voltage drop occurs, in some cases, a predetermined voltage value may fail to be satisfied, thus resulting in an inoperative condition of the system.

Further, in a system where apparatuses are in a daisy chain connection and where power is supplied from a first AC power supply, a power receiving apparatus downstream of a power receiving apparatus connected to the first AC power supply can also receive power from a second AC power supply connected to the power receiving apparatus. However, due to high resistance in the power receiving apparatus, which is connected to the second AC power supply, voltage drop may be increased. In such a case, the voltage of the second AC power supply may drop, and operation of the downstream apparatuses may become unstable.

SUMMARY OF THE INVENTION

The present invention is directed to a method for implementing stable operation of a system used for supplying power via a transmission line. Further, the present invention is directed to a method for implementing stable operation of a power receiving apparatus or a downstream apparatus.

According to an aspect of the present invention, an information processing apparatus includes a first power receiving unit configured to directly receive power from a power supply, a second power receiving unit configured to receive power from an external apparatus via a signal transmission line, a first comparison unit configured to compare a voltage value of a power supplied via the first power receiving unit and a voltage value of a power supplied via the second power receiving unit, and a control unit configured to enable the power determined to have a higher voltage as a result of a comparison made by the first comparison unit to be used within the information processing apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 is a flowchart illustrating a process of each apparatus in the 2.1 channel speaker system illustrated in FIG. 1 and executed after the operations illustrated in FIG. 4 are finished.

FIG. 6 illustrates a configuration of a power supply system according to a second exemplary embodiment of the present invention.

FIG. 7 illustrates a block diagram of a configuration of a power receiving apparatus in the power supply system according to the second exemplary embodiment of the present invention.

FIG. 8 is a flowchart illustrating an operation according to the second exemplary embodiment of the present invention.

FIGS. 10A through 10D illustrate operations of power supply with respect to voltage values illustrated in FIGS. 9A through 9D, respectively.

DETAILED DESCRIPTION OF THE EMBODIMENTS

Various exemplary embodiments, features, and aspects of the invention will be described in detail below with reference to the drawings.

Figure 1:
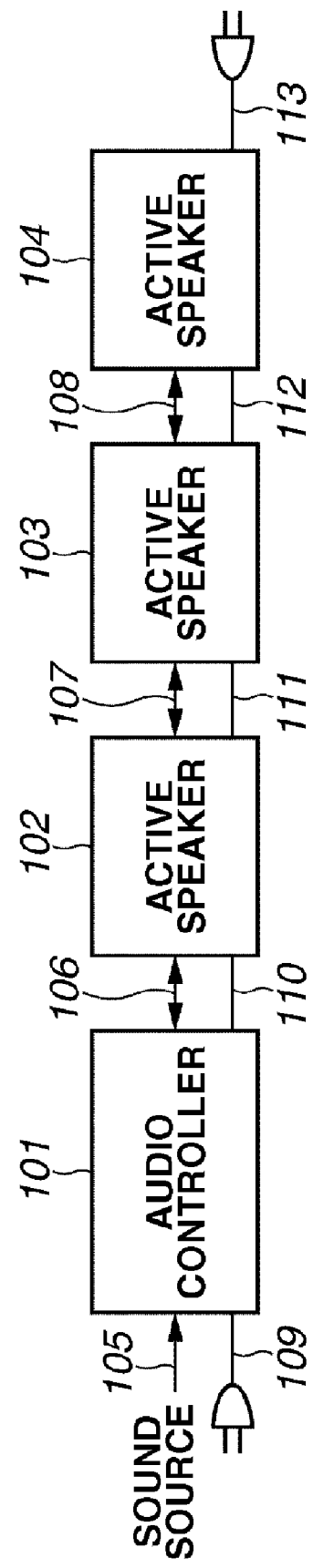
FIG. 1 illustrates a 2.1 channel speaker system according to a first exemplary embodiment of the present invention.

FIG. 1 illustrates a 2.1 channel speaker system according to a first exemplary embodiment of the present invention. The speaker system includes an audio controller 101 and active speakers 102, 103, and 104. The active speakers 102, 103, and 104 function as a front left speaker, a front right speaker, and a sub-woofer, respectively. A sound source signal 105 is a signal for outputting sound from the active speakers 102 through 104. The source signal 105 is input, for example, by a compact disc (CD) player via a voice cord. Transmission lines 106, 107, and 108 are lines used for transmitting the sound source signal 105 to each of the speakers and serve also as lines for transmitting a communication signal. AC power supply cords 109 and 113 are cords used for transmitting AC power supplied from outlets. AC cables 110, 111, and 112 are cables used for transmitting AC power between the apparatuses. It is to be noted that the audio controller 101 and each of the active speakers 102 through 104 are examples of apparatuses applied to the information processing apparatus according an exemplary embodiment of the present invention.

Figure 2:
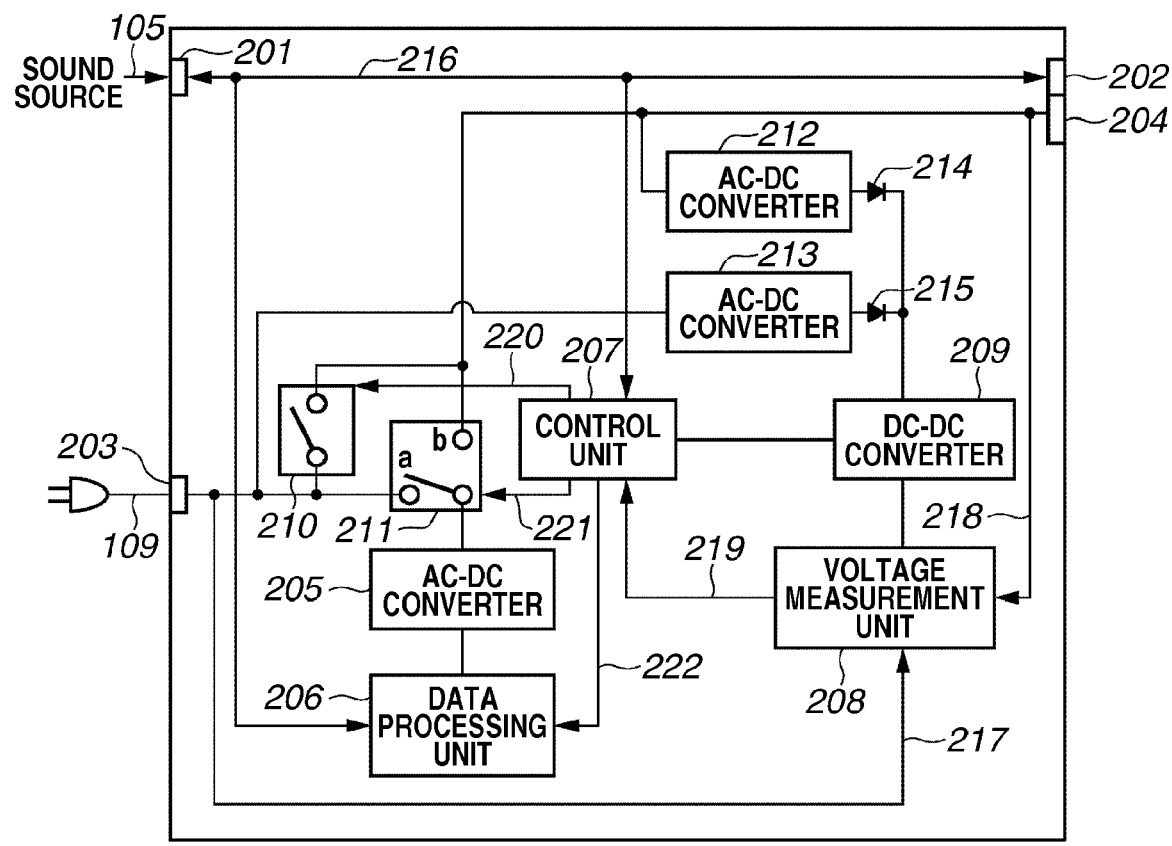
FIG. 2 illustrates a detailed block diagram of an audio controller illustrated in FIG. 1.

FIG. 2 illustrates a detailed block diagram of the audio controller 101 illustrated in FIG. 1. The sound source signal 105 and the AC power supply cord 109 illustrated in FIG. 1 are also illustrated in FIG. 2.

A connector 201 connects an audio cord used for transmitting the sound source signal 105. A connector 202 connects a cable used for transmitting a sound source signal, as well as a communication signal, to the active speakers 102 through 104.

A connector 203 is an AC inlet that connects the AC power supply cord 109 to the audio controller 101. A connector 204 is used for supplying the AC power supplied from the connector 203 to the active speakers 102 through 104. Additionally, the connector 204 is also used for receiving power via the active speakers 102 through 104. Different cables can be connected to the connector 202 and 204 as illustrated in FIG. 1. However, a single cable that is separated at the connectors 202 and 204 is used according to the present embodiment. It is to be noted that a one-piece connector including the functions of the connectors 202 and 204 can also be used.

An AC-DC converter 205 supplies DC power to electrical components in the audio controller 101. A data processing unit 206 processes a sound source signal and operates with the DC power supplied from the AC-DC converter 205.

A control unit 207 controls supply of the AC power to the data processing unit 206 or to the components in the audio controller 101. A voltage measurement unit 208 measures a voltage of AC power supplied to the audio controller 101. A DC-DC converter 209 supplies DC power to the control unit 207 and the voltage measurement unit 208. A relay 210 is a switch used for supplying/stopping supplying the AC power supplied from the connector 203 to the connector 204. A single-contact (ON/OFF) relay or the like is used for the relay 210. A relay 211 is a switch used for supplying either the AC power supplied from the connector 203 or the AC power supplied from the connector 204 to the AC-DC converter 205. A double-contact relay or the like is used for the relay 211.

AC-DC converters 212 and 213 supply DC power to the DC-DC converter 209. Diodes 214 and 215 are used when either the AC power supplied from the connector 203 or the AC power supplied from the connector 204 is supplied to the DC-DC converter 209. When the AC power is converted into DC power by the AC-DC converters 212 and 213, the diodes 214 and 215 prevent DC currents from flowing into the other line.

A transmission line 216 is a bidirectional transmission line used for transmitting the sound source signal 105. The transmission line 216 is also used for communication between the apparatuses in the system. A transmission line 217 is used when a voltage value of the AC power supplied from the AC power supply cord 109 is measured. A transmission line 218 is used when a voltage value of the AC power supplied from an active speaker via the connector 204 is measured. Each of the transmission lines 217 and 218 is connected to the voltage measurement unit 208.

A control line 219 is used for sending a result of measurement of the voltage value of each AC power performed by the voltage measurement unit 208 to the control unit 207. Control lines 220 and 221 are used when the control unit 207 controls open/close operation or contact-switching operation of the relays 210 and 211, respectively. A control line 222 is used when the control unit 207 controls the data processing unit 206.

Figure 3:
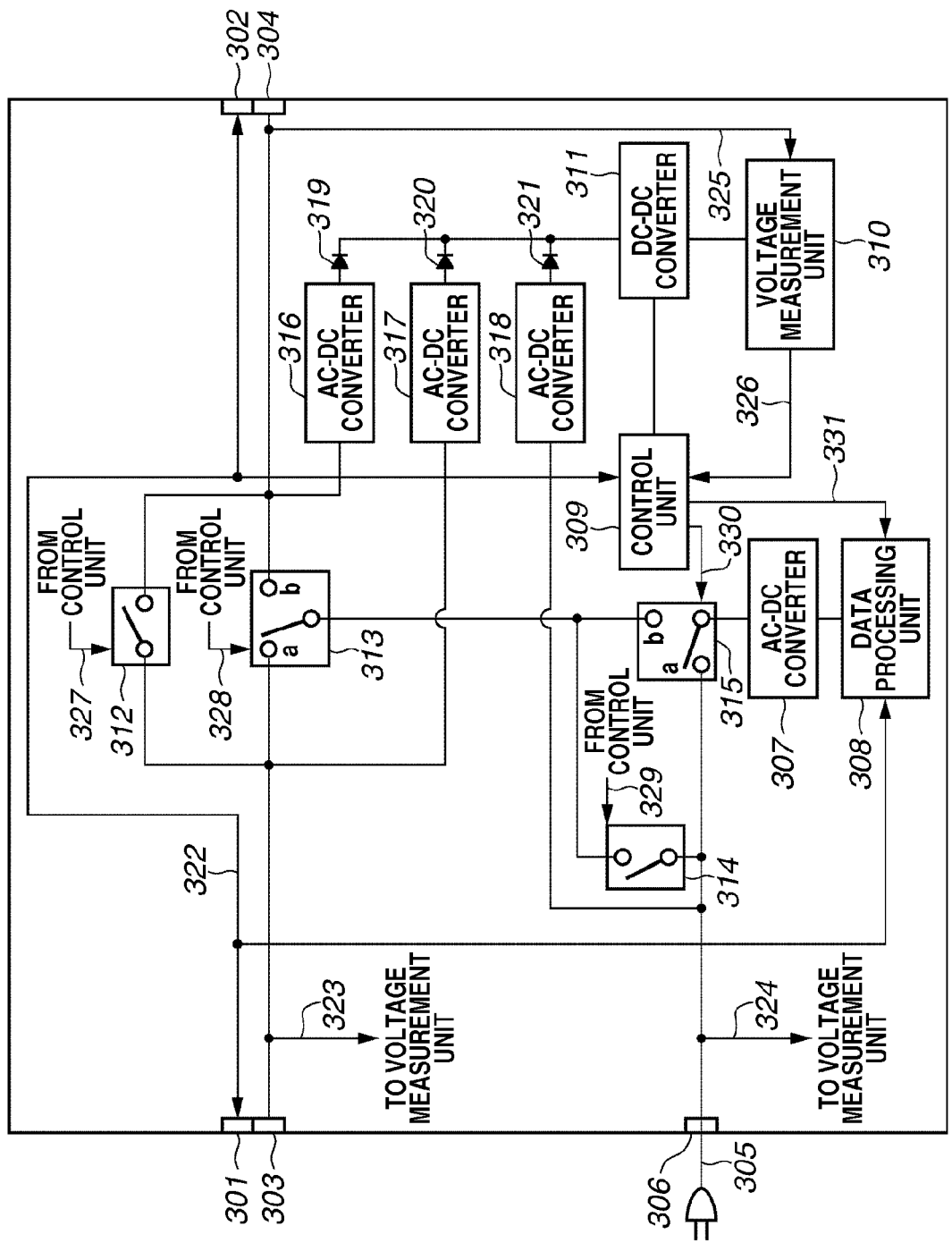
FIG. 3 illustrates a detailed block diagram of an active speaker illustrated in FIG. 1.

FIG. 3 illustrates a detailed block diagram of the active speaker 102, 103, or 104 illustrated in FIG. 1.

A connector 301 connects a cable used for receiving the sound source signal 105 from the audio controller 101 to the active speaker. The cable is also used for receiving the sound source signal 105 from another active speaker. A connector 302 connects a cable used for transmitting the sound source signal 105 (and communication signal) to another active speaker.

A connector 303 connects a cable which is used when AC power is supplied from the audio controller 101 or another active speaker to the present active speaker. The connector 303 also connects a cable which is used when the present active speaker supplies AC power to the audio controller 101 or to another active speaker. A connector 304 connects a cable which is used when AC power is supplied from another active speaker to the present active speaker. The connector 304 also connects a cable which is used when the present active speaker supplies AC power to another active speaker.

As described above with reference to FIG. 2, different cables can be connected to the connector 302 and 304 as illustrated in FIG. 1. However, a single cable that is separated at the connectors 302 and 304 is used according to the present embodiment. It is to be noted that a one-piece connector including the functions of the connector 301 and the 303, or a one-piece connector including the function of the connector 302 and 304, can also be used.

An AC power supply cord 305 is a cord used for transmitting commercial power supplied from an outlet. A connector 306 is an AC inlet used for connecting the AC power supply cord 305 to the active speaker. An AC-DC converter 307 is used for supplying DC power to the electrical components in the active speaker. A data processing unit 308 processes a sound source signal and operates with power supplied from the AC-DC converter 307.

A control unit 309 controls the data processing unit 308 or controls supply of AC power to the active speaker. A voltage measurement unit 310 measures a voltage of AC power in the active speaker. A DC-DC converter 311 supplies DC power to the control unit 309 and the voltage measurement unit 310.

A relay 312 is a switch used for supplying/stopping supplying the AC power supplied from the connector 303 to the connector 304, or supplying/stopping supplying AC power supplied from the connector 304 to the connector 303. A single-contact (ON/OFF) relay or the like is used for the relay 312.

A relay 313 is a switch used for supplying the AC power supplied from the connector 303 or the connector 304 to the AC-DC converter 307. A double-contact relay or the like is used for the relay 313.

A relay 314 is a switch used for supplying or stopping supplying AC power supplied from the connector 306 to the connectors 303 and 304. A single contact (ON/OFF) relay or the like is used for the relay 314.

A relay 315 is a switch used for supplying either the AC power supplied from the connector 306 or the AC power supplied from the connector 303 or 304 to the AC-DC converter 307. A double-contact relay or the like is used for the relay 315.

AC-DC converters 316, 317, and 318 supply DC power to the DC-DC converter 311. Diodes 319, 320, and 321 are used when the AC power supplied from the connectors 303, 304, and 306 is supplied to the DC-DC converter 311. When the AC power is converted into DC power by the AC-DC converters 316, 317, and 318, the diodes 319, 320, and 321 prevent DC currents from flowing into another line.

A transmission line 322 is a bidirectional transmission line that transmits the sound source signal 105. The transmission line 322 is also used for communication between the apparatuses in the system. A transmission line 323 is used when a voltage value of the AC power supplied via the connector 303 is measured. A transmission line 324 is used when a voltage value of the AC power supplied via the connector 306 is measured. A transmission line 325 is used when a voltage value of the AC power supplied from the active speaker via the connector 304 is measured. Each of the transmission lines 323, 324, and 325 is connected to the voltage measurement unit 310.

A control line 326 is used for sending a result of measurement of the voltage value of AC power performed by the voltage measurement unit 310 to the control unit 309.

Control lines 327, 328, 329, and 330 are used when the control unit 207 controls open/close or contact switching operations of the relays 312, 313, 314, and 315, respectively. A control line 331 is used when the control unit 309 controls the data processing unit 308.

According to the configuration of connection illustrated in FIG. 1, the AC power supply cord 305 is connected to neither the active speaker 102 nor the active speaker 103. Further, the active speaker 104 is connected to the active speaker 103 via the connectors 301 and 303, while none is connected to the sound source connector 302 and the AC power supply connector 304.

Table 1 illustrates the relationship between a combination of AC power supplied via the connectors 203 and 204 and the relays 210 and 211 in the audio controller 101 illustrated in FIG. 2. As illustrated in table 1, there are four different combinations (cases (1) through (4)) in the supply of power.

TABLE 1

|  | CN 203 | CN 204 | RELAY 210 | RELAY 211 |
|---|---|---|---|---|
| (1) | 0 | 0 | OFF | a |
| (2) | 0 | 1 | OFF | b |
| (3) | 1 | 0 | ON | a |
| (4) | 1 | 1 | OFF | X |

In table 1, numeral 1 denotes a case where AC power is supplied via the connector 203 or 204, while numeral 0 denotes a case where AC power is not supplied via the connector 203 or 204. Further, "ON" and "OFF" (binary) denote a state of the relay 210, and "a", "b", and "X" (ternary) denote a state of the relay 211. As illustrated in FIG. 2, the state "a" represents a state where the relay 211 is connected to a "terminal a" on the side of the connector 203. The state "b" represents a state where the relay 211 is connected to a "terminal b" on the side of the connector 204. The state "X" represents a state where the connection of the relay 211 is not fixed but changed between terminals "a" and "b" depending on voltages of power supplied from the connectors 203 and 204. The relay 211 is connected to either the "terminal a" or the "terminal b" at any point in time.

If power is not supplied to the audio controller 101, or if AC power is not supplied to neither the connector 203 nor the connector 204 (case (1)), then the relay 210 is set to "OFF" and the relay 211 is connected to terminal "a". If AC power is supplied to the connector 204 but not to the connector 203 (case (2)), then the relay 210 is set to "OFF" and the relay 211 is connected to terminal "b". If AC power is supplied to the connector 203 but not to the connector 204 (case (3)), then the relay 210 is set to "ON" and the relay 211 is connected to terminal "a".

If AC power is supplied to both of the connectors 203 and 204 (case (4)), then the relay 210 is set to "OFF" and the relay 211 is connected to the terminal having a higher voltage of AC power supplied from either the connector 203 or 204. In other words, if the voltage value of the AC power supplied from the connector 203 is higher than that supplied from the connector 204, the relay 210 is connected to the "terminal a". If the voltage of the AC power supplied from the connector 204 is higher than that supplied from the connector 203, the relay 210 is connected to the "terminal b".

Table 2 illustrates the relationship between a combination of AC power supplied via the connectors 303, 304, and 306 and the relays 312, 313, 314, and 315 in the active speaker illustrated in FIG. 3. As illustrated in table 2, there are eight different combinations (cases (1) through (8)) in the supply of power.

TABLE 2

|  | CN 303 | CN 304 | CN 306 | RELAY 312 | RELAY 313 | RELAY 314 | RELAY 315 |
|---|---|---|---|---|---|---|---|
| (1) | 0 | 0 | 0 | OFF | a | OFF | a |
| (2) | 0 | 0 | 1 | ON | a | ON | a |
| (3) | 0 | 1 | 0 | ON | b | OFF | b |
| (4) | 0 | 1 | 1 | X | X | X | X |
| (5) | 1 | 0 | 0 | ON | a | OFF | b |
| (6) | 1 | 0 | 1 | X | X | X | X |
| (7) | 1 | 1 | 0 | OFF | X | OFF | b |
| (8) | 1 | 1 | 1 | OFF | X | OFF | X |

In table 2, numeral 1 denotes a case where AC power is supplied via the connector 303, 304, or 306, while numeral 0 denotes a case where AC power is not supplied via the connector 303, 304, or 306. Further, "ON" and "OFF" (binary) denote a state of the relays 312 and 314, and "a", "b", and "X" (ternary) denote a state of the relays 313 and 315.

As illustrated in FIG. 3, with respect to the relay 313, the state "a" represents a state where the relay is connected to a "terminal a" on the side of the connector 303 and the state "b" represents a state where the relay is connected to a "terminal b" on the side of the connector 304. Similarly, with respect to the relay 315, the state "a" represents a state where the relay is connected to a "terminal a" on the side of the connector 306 and the state "b" represents a state where the relay is connected to a "terminal b" on the side of the relay 313. The state "X" represents a state where the state is either "a" or "b" depending on voltages of the supplied power, and thus the state is not uniquely determined.

If power is not supplied to the active speaker (case (1)), then the relay 312 is set to OFF, the relay 313 is connected to terminal "a", the relay 314 is set to OFF, and the relay 315 is connected to terminal "a".

If AC power is supplied only from the connector 306 (case (2)), then the relay 312 is set to ON, the relay 313 is connected to terminal "a", the relay 314 is set to ON, and the relay 315 is connected to terminal "a".

If AC power is supplied only from the connector 304 (case (3)), then the relay 312 is set to ON, the relay 313 is connected to terminal "b", the relay 314 is set to OFF, and the relay 315 is connected to terminal "b".

If AC power is supplied from the connectors 304 and 306 (case (4)), the connection of the relays depends on voltages of power supplied via the connectors. If the voltage at the connector 304 is higher than the voltage at the connector 306, then the relay 312 is set to ON, the relay 313 is connected to terminal "b", the relay 314 is set to OFF, and the relay 315 is connected to terminal "b". If the voltage at the connector 304 is lower than the voltage at the connector 306, then the relay 312 is set to OFF, the relay 313 is connected to terminal "a", the relay 314 is set to "ON", and the relay 315 is connected to terminal "a".

If AC power is supplied only from the connector 303 (case (5)), then the relay 312 is set to ON, the relay 313 is connected to terminal "a", the relay 314 is set to OFF, and the relay 315 is connected to terminal "b".

If AC power is supplied from the connectors 303 and 306 (case (6)), the connection of the relays depends on voltages of power supplied via the connectors. If the voltage at the connector 303 is higher than the voltage at the connector 306, then the relay 312 is set to ON, the relay 313 is connected to terminal "a", the relay 314 is set to OFF, and the relay 315 is connected to terminal "b". If the voltage at the connector 303 is lower than the voltage at the connector 306, then the relay 312 is set to OFF, the relay 313 is connected to terminal "b", the relay 314 is set to "ON", and the relay 315 is connected to terminal "a".

If AC power is supplied from the connectors 303 and 304 (case (7)), the relay 312 is set to OFF, the relay 313 is connected to the contact with a higher voltage (i.e., terminal "a" if the electric potential at the terminal on the side of the connector 303 is higher, and terminal "b" if the electric potential at the terminal on the side of the connector 304 is higher). Further, the relay 314 is set to OFF and the relay 315 is connected to terminal "b".

If AC power is supplied to all of the connectors 303, 304, and 306 (case (8)), then the connection of the relays depends on voltage values at the connectors. If the voltage value of the connector 303 is the highest, the relay 313 is connected to terminal "a", and the relay 315 is connected to terminal "b". If the voltage value of the connector 304 is the highest, the relay 313 is connected to terminal "b", and the relay 315 is connected to terminal "b". If the voltage value of the connector 306 is the highest, the relay 313 can be connected to either terminal "a" or "b". However, since the initial setting is terminal "a" (the setting in case (1) is regarded as the initial setting), the relay 313 is connected to terminal "a", and the relay 315 is connected to terminal "a". Both of the relays 312 and 314 are set to OFF regardless of which connector has the highest voltage value.

As described above, by switching relays depending on the voltage values of the AC power, the AC power having the highest voltage value is supplied to the internal circuits of the audio controller 101 and the active speakers 102 through 104.

Figure 4:
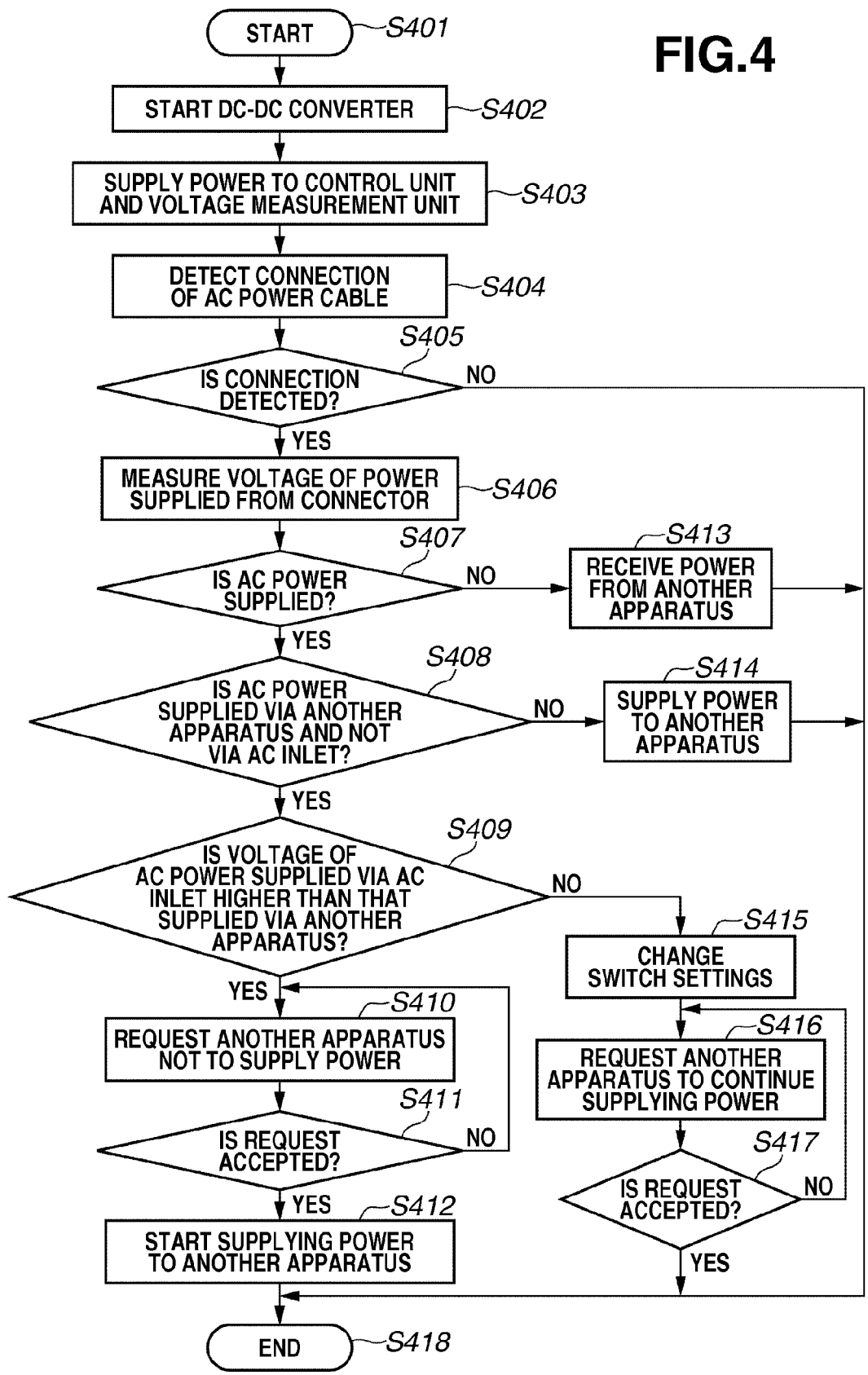
FIG. 4 is a flowchart illustrating operations of the audio controller and the active speaker illustrated in FIG. 1.

FIG. 4 is a flowchart illustrating operations of the audio controller 101 and the active speakers 102 through 104 illustrated in FIG. 1. In step S401, the audio controller 101 is started when the DC-DC converter 209 receives AC power via the diode 214 or 215, and each of the active speakers 102 through 104 is started when the DC-DC converter 311 receives AC power via the diode 319, 320, or 321. Referring now to FIGS. 2, 3 and 4, processing of each of the apparatuses will be described in detail.

In step S402, DC power is supplied to each of the DC-DC converters 209 and 311 in FIGS. 2 and 3 via each of the corresponding diodes. The voltage of the DC power is then converted into a voltage level appropriate for each of the control units 207 and 309, as well as each of the voltage measurement units 208 and 310. In step S403, the DC power is supplied to each of the control units 207 and 309 and each of the voltage measurement units 208 and 310.

In step S404, the control unit 207, which is started in step S403 by receiving power, detects whether an AC power cable is connected to the connector 204. Similarly, the control unit 309, which is started in step S403, detects whether AC power cables are connected to the connectors 303 and 304. Connection detection units used for detecting the connection are not shown. Further, a method for detecting the connection is a publicly known technique. For example, a method for detecting connection by measuring a change in voltage applied to a portion of a connector when a power cable is plugged in can be used at each control unit.

In step S405, each of the control units 207 and 309 determines whether the connection of the AC power cable is detected by the detection units. If the connection of the AC power cable is determined (YES in step S405), then the process proceeds to step S406. If the connection of the AC power cable is not determined (NO in step S405), then the process proceeds to step S418. In step S418, the process ends.

In step S406, the voltage measurement units 208 measures a voltage of the power supplied from each of the connectors 203, and 204 using transmission lines 217 and 218. Similarly, the voltage measurement unit 310 measures a voltage of power supplied from each of the connectors 303, 304, and 306 using transmission lines 323, 324, and 325. In step S407, each of the control units 207 and 309 determines whether AC power is supplied to the corresponding AC inlet (Ac inlet 203 or 306) according to the result of the measurement obtained in step S406. If AC power is supplied (YES in step S407), the process proceeds to step S408. If AC power is not supplied (NO in step S407), then the process proceeds to step S413.

In step S408, each of the control units 207 and 309 determines whether power other than the power supplied from the AC inlets 203 and 306 is being supplied based on the result of the measurement obtained in step S406. If such power is being supplied (YES in step S408), the process proceeds to step S409. If such power is not being supplied (NO in step S408), then the process proceeds to step S414.

In step S409, the control units 207 compares the AC power supplied via the AC inlet 203 and the AC power supplied via a different connector. Similarly, the control unit 309 compares the AC power supplied via the AC inlet 306 and the AC power supplied via other connectors. If the AC power supplied via the AC inlets is higher than the AC power supplied via other connectors (YES in step S409), then the process proceeds to step S410. If the AC power supplied via the AC inlets is not higher than the AC power supplied via other connectors (NO in step S409), then the process proceeds to step S415.

In step S410, the control unit 207 or the control unit 309 requests another apparatus, supplying AC power, to stop supplying the AC power and notifies, via the communication line 216 or 322, that AC power will be supplied from the present apparatus. Instep S411, the control unit 207 or 309 determines whether the request made in step S410 is accepted. If the request is accepted (YES in step S411), the process proceeds to step S412. If the request is not accepted (NO in step S411), then the process returns to step S410.

In step S412, the control unit 207 or 309 changes settings of each of the corresponding relays so that AC power is supplied to the apparatus that has stopped supplying power. Then, the process proceeds to step S418. In step S418, the process ends.

If process proceeds from step S407 to step S413, in step S413, the control unit 207 or 309 changes settings of each of the corresponding relays according to table 1 or 2 so that AC power is supplied from another apparatus to the present apparatus. After AC power is received from another apparatus, the process proceeds to step S418, and then the process ends.

If process proceeds from step S408 to step S414, in step S414, the control unit 207 or 309 changes settings of each of the corresponding relays according to table 1 or 2 so that AC power is supplied to another apparatus. After the AC power is supplied to another apparatus, the process proceeds to step S418, and then the process ends.

If process proceeds from step S409 to step S415, in step S415, the control unit 207 or 309 changes settings of each of the corresponding relays according to table 1 or 2 so that AC power is supplied from another apparatus. In this way, power for driving the data processing unit 206 or 308 is supplied from another apparatus.

In step S416, the control unit 207 or 309 requests to continue supplying power. In step S417, the control unit 207 or 309 determines whether the request is accepted. If the request is accepted (YES in step S417), the process proceeds to step S418 and then the process ends. On the other hand, if the request is not accepted (NO in step S417), then the process returns to step S416, and the request is repeated.

FIG. 5 is a flowchart illustrating a process of each apparatus in the 2.1 channel speaker system illustrated in FIG. 1 and executed after the operations illustrated in FIG. 4 are finished.

Step S501 of the flowchart is started after step S418 of the flowchart in FIG. 4 is finished.

In step S502, each of the control unit 207 of the audio controller 101 and the control unit 309 of the active speakers 102 through 104 receives voltage value information on the AC power supplied via each of the corresponding connectors from the voltage measurement units 208 and 310.

In step S503, each of the control units 207 and 309 determines whether AC power is supplied from a plurality of connectors according to the voltage value information on AC power obtained in step S502. If AC power is supplied from a plurality of connectors (YES in step S503), then the process proceeds to step S504. If AC power is not supplied from a plurality of connectors (NO in step S503), then the process returns to step S502.

In step S504, each of the control units 207 and 309 determines whether the voltage value of AC power which is currently used by the data processing unit 206 or 308 is higher than the voltage value of AC power which is not currently used. If the voltage of AC power which is currently used is higher than the voltage of AC power which is not currently used (YES in step S504), then the process proceeds to step S506. If the voltage of AC power which is currently used is lower than the voltage of AC power which is not currently used (NO in step S504), then the process proceeds to step S505.

In step S505, each of the control units 207 and 309 changes settings of each of the corresponding relays according to table 1 or 2 so that the AC power which is not currently used can be used.

In step S506, each of the control units 207 and 309 compares the voltage value of the AC power which is currently used by the data processing unit 206 or 308 and the voltage value of the AC power which is not currently used. At this time, the voltage values of the AC power which is not currently used are voltage values considering an amount of power consumed at each loading portion including the data processing unit 206 or 308 in each of the apparatuses. In other words, the voltage value of the AC power which is currently used and a voltage value obtained by subtracting voltage drop in each of the apparatuses from the input voltage value of the AC power which is not currently used are compared. As a result of the comparison, if the voltage difference is equal to or greater than a voltage value set in advance (a predetermined value), and further, if the voltage of AC power which is not currently used is lower than that of AC power which is currently used (YES in step S506), then the process proceeds to step S507. If the voltage difference is smaller than the predetermined value (NO in step S506), then the process returns to step S502. Processing in steps S502 to S506 is repeated at regular intervals.

In step S507, the control unit 207 or 309 requests another apparatus, which is a supply source of AC power, to stop supplying the AC power and notifies that AC power will be supplied from the current apparatus. In step S508, the control unit 207 or 309 determines whether the request made in step S507 is accepted. If the request is not accepted (NO in step S508), then the process returns to step S507. If the request is accepted (YES in step S508), then the process proceeds to step S509.

In step S509, the control unit 207 or 309 switches the corresponding relays so that AC power is supplied to another apparatus. Then, the process proceeds to step S510. In step S510, the process ends.

According to the present exemplary embodiment, a plurality of power sources are changed depending on the voltage values measured by the voltage measurement unit 208 illustrated in FIG. 2 and the voltage measurement unit 310 illustrated in FIG. 3. However, besides changing the plurality of power sources according to the voltage values, the plurality of power sources can be changed by measuring a difference in current values or power factor values, and using the values to change the plurality of power sources.

As described above, each apparatus supplies AC power to another apparatus or is supplied with AC power from another apparatus. According to the present exemplary embodiment, AC power is supplied to each of the audio controller 101 and the active speaker 104 from the AC inlets. Each of the active speakers 102 and 103 receives supply of AC power from the audio controller 101 or from the active speaker 104. In this case, one of the active speakers 102 and 103 receives AC power from another apparatus and supplies the received AC power to another apparatus. This processing is performed by connecting the relay 312 illustrated in FIG. 3.

The other of the active speakers 102 and 103 receives AC power from two other apparatuses. At this time, the relay 312 is set to OFF and the relay 315 is connected to the terminal via which the AC power is supplied. The terminal of the unused AC power of the relay 315 is the terminal that is unconnected. In this way, an apparatus receiving AC power from a plurality of apparatuses constantly monitors the AC power according to the loop in steps S502 through S506 of the flowchart illustrated in FIG. 5. If a difference of voltages of the AC power becomes greater than a predetermined potential difference, the supply of AC power from the apparatus supplying a lower voltage is stopped and AC power is supplied to that apparatus. In other words, the AC power-supplying apparatus and the AC power-supplied apparatus replace each other. According to the present exemplary embodiment, only one apparatus in the system receives supply of AC power from a plurality of lines. This apparatus constantly monitors a plurality of AC voltages, so that apparatuses in the system can operate with AC power of higher voltage.

Next, a second exemplary embodiment of the present invention will be described. FIG. 6 illustrates a configuration of a power supply system according to the second exemplary embodiment of the present invention. A controller 2101 is connected to a first AC power supply 2107 and supplies power to downstream apparatuses in a daisy chain connection. Power receiving apparatuses 2102 and 2103 are in a daisy chain connection with the controller 2101 and receive power. Power receiving apparatuses 2104 and 2105 receive power from upstream apparatuses as the power receiving apparatuses 2102 and 2103 do. A power cable 2106 is used for supplying power. A power receiving apparatus 2110 is an apparatus similar to the power receiving apparatuses 2102 through 2104, but is different in that the power receiving apparatus 2110 is also connected to a second AC power supply 2111. It is to be noted that the power receiving apparatus 2110 is an application example of the information processing apparatus according to the present exemplary embodiment.

FIG. 7 illustrates a block diagram of a configuration of the power receiving apparatus 2110 in the power supply system according to the present exemplary embodiment. A central processing unit 2201 controls the power receiving apparatus 2110. A voltage detection unit 2202 is used for detecting voltages at various points. A memory 2203 stores a voltage drop value in the power receiving apparatus 2110. An input unit 2204 is used for inputting a voltage drop value. A relay driver unit 2205 drives a relay used for selecting either the input power supplied via the upstream apparatus or the power from the second AC power supply. The relay driver unit 2205 also drives a relay used for selecting power that is supplied to a downstream apparatus. A voltage detection A unit 2206 measures a voltage value of power input via the upstream apparatus. A voltage detection B unit 2207 measures a voltage value of the second AC power supply.

An internal power supply unit 2208 supplies a drive power of the power receiving apparatus 2110. A relay contact 2209 (SW0) is used for changing settings of input power. A relay contact 2210 (SW1) is used for changing settings of power supplied to the downstream apparatus. A voltage measuring point 2211 (output voltage CP) is a point at which a voltage of power supplied to the downstream apparatus is measured. A connector 2212 connects the upstream apparatus to the power receiving apparatus 2110.

FIG. 8 is a flowchart illustrating an operation of the second exemplary embodiment. FIGS. 9A through 9D are graphs each illustrating a voltage value of power supplied from an upstream apparatus, a voltage value obtained by subtracting a voltage drop value in the power receiving apparatus 2110 from the voltage value of the power supplied from the upstream apparatus, a voltage of power supplied from the second AC power supply 2111, and a voltage value obtained by subtracting a voltage drop value in the power receiving apparatus 2110 from the voltage value of the power supplied from the second AC power supply 2111. FIGS. 11A through 11D illustrate operations of power supply with respect to voltage values illustrated in FIGS. 9A through 9D, respectively. Table 3 illustrates combinations of the internal operation power of the power receiving apparatus 2110 and the power supplied to the downstream apparatuses.

Now, the operation of the second exemplary embodiment will be described referring to the above-described figures and table. In FIG. 6, power supplied from the first AC power supply 2107 is supplied to the power receiving apparatuses 2102 through 2105, which are downstream apparatuses in daisy chain connection, via the controller 2101. AC power can be passed on to the power receiving apparatuses in daisy chain connection. According to the present exemplary embodiment, a case where the second AC power supply 2111 is connected to the power receiving apparatus 2110 will be described.

The power receiving apparatuses 2104 and 2105 downstream of the power receiving apparatus 2110 can receive power supplied from the first AC power supply 2107 via the controller 2101 as well as the power supplied from the second AC power supply 2111 via the power receiving apparatus 2110. The power receiving apparatus 2110, to which the second AC power supply 2111 is connected, can change the power to be used in the internal operation power as well as the power to be supplied to the downstream apparatuses 2104 and 2105 using the power supplied from the first AC power supply 2107 and the power supplied from the second AC power supply 2111.

The power receiving apparatus unconnected to an AC power supply uses power supplied from its upstream apparatus for its internal operation power and supplies the power supplied from the upstream apparatus to its downstream apparatus. Such a power receiving apparatus is not capable of changing power that is supplied to its downstream apparatus.

The internal operation power of the power receiving apparatus 2110 is determined by comparing a voltage value of the power supplied from the upstream apparatus and a voltage value of the second AC power supply 2111, and selecting the power with a higher voltage value. As for the power supplied to the downstream apparatus, if the voltage of the power selected for the internal operation power drops due to voltage drop in the apparatus and becomes lower than the power that has not been selected as the internal operation power, then the power that has not been selected as the internal operation power is selected as the power to be supplied to the downstream apparatus.

Classification of voltages will now be described. V1 represents an input voltage value of power supplied from the upstream apparatus to the power receiving apparatus 2110. V2 represents an input voltage value of the second AC power supply 2111 connected to the power receiving apparatus 2110. V0 represents a voltage drop value in the power receiving apparatus 2110. Va represents an output voltage value of the power receiving apparatus 2110, which is obtained by subtracting the voltage drop value V0 from the input voltage value V1 in the case where internal operation is performed by the power supplied from the upstream power receiving apparatus. Vb represents an output voltage value of the power receiving apparatus, which is obtained by subtracting the voltage drop value V0 from the input voltage value V2 of the second AC power supply 2111 in the case where an internal operation is performed with the power supplied from the second AC power supply 2111. Table 3 illustrates the combination of power supply.

TABLE 3

| Internal Voltage | Power to Downstream Apparatus | Remarks |
| --- | --- | --- |
| V1 (V1 > V2) | Va (Va > V2) | Va is higher than V2 despite the voltage drop. |
|  | V2 (V2 > Va) | V2 is higher due to voltage drop. |
| V2 (V2 > V1) | V1 (V1 > Vb) | Better to supply V1 due to voltage drop. |
|  | Vb (Vb > V1) | Better to supply Vb despite the voltage drop. |

Referring to FIG. 7, with respect to the block diagram of the power receiving apparatus 2110, to which the second AC power supply 2111 is connected, an amount of current consumption of the components in the power receiving apparatus 2110 is measured in advance. The current consumption of the components includes relay contact in the power receiving apparatus 2110, direct current resistance of coil, contact resistance of switch, and resistance value of cable. In step S2301, based on the values obtained from the measurement, the voltage drop value V0 of the power receiving apparatus 2110 is set using the input unit 2204. The data is stored in the memory 2203 via the central processing unit 2201. In this way, the voltage drop value in the power receiving apparatus 2110 can be set.

Next, in step S2302, the voltage detection A unit 2206 measures a voltage of the power supplied to the connector 2212 from the power receiving apparatus 2103, which is connected to the connector 2212 by the power cable 2106. This voltage value is the input voltage value V1 described above. In step S2303, the central processing unit 2201 stores the output voltage value Va in the memory 2203. The output voltage value Va is calculated by subtracting the voltage drop value V0 in the power receiving apparatus 2110 from the input voltage value V1.

Next, in step S2304, the voltage detection B unit 2207 determines whether the second AC power supply 2111 is connected to the power receiving apparatus 2110. The second AC power supply 2111 is determined as not connected to the power receiving apparatus 2110 if the voltage value detected by the voltage detection B unit 2207 is zero. If the voltage detection B unit determines that the second AC power supply 2111 is not connected to the power receiving apparatus 2110 (NO in step S2304), then the process proceeds to step S2305. In step S2305, the power receiving apparatus 2110 and the power receiving apparatuses downstream of the power receiving apparatus 2110 (i.e., the power receiving apparatuses 2104 and 2105) are operated with the power supplied from the power receiving apparatus 2103.

On the other hand, if the voltage detection B unit determines that the second AC power supply 2111 is connected to the power receiving apparatus 2110 (YES in step S2304), then the process proceeds to step S2306. In step S2306, the voltage detection B unit 2207 measures the voltage value (V2) of the power supplied from the second AC power supply 2111 to the power receiving apparatus 2110. Next, in step S2307, the central processing unit 2201 stores the output voltage value Vb in the memory 2203. The output voltage value Vb is obtained by subtracting the voltage drop value V0 in the power receiving apparatus 2110 from the input voltage value V2.

Next, a method for selecting power appropriate for use in the power receiving apparatus 2110 as well as power appropriate for the downstream power receiving apparatuses will be described.

The power to be used in the power receiving apparatus 2110 is selected from the power supplied from the upstream apparatus and the power supplied from the second AC power supply 2111, whichever is higher in voltage. The method for selecting the power will be described below.

First, a current supply relay 2213 (SW100) is set to OFF. This setting is to prevent voltage drop in the downstream apparatuses that occurs when power is supplied to the apparatuses as well as to avoid the risk of the current flowing into the downstream apparatuses.

The relay contact 2209 (SW0) is connected to the terminal (1) in FIG. 7 if power is not supplied to the power receiving apparatus 2110. This state is unchanged even if power is supplied to the power receiving apparatus 2110 so long as the central processing unit 2201 does not give an instruction to cancel the state. The supply of power to the power receiving apparatus 2110 starts when the power cable 2106, which is connected to the power receiving apparatus 2103, is connected to the connector 2212. When the cable 2106 is connected, power is supplied to the internal power supply unit 2208. By the power supplied to the internal power supply unit 2208, the power receiving apparatus 2110 starts operation of the internal circuitry including the central processing unit 2201. The central processing unit 2201 drives the voltage detection A unit 2206. Then, the power (V1) supplied via the power receiving apparatus 2103 is detected. The result is sent to the central processing unit 2201 by the voltage detection unit 2202.

Next, the voltage of the second AC power supply 2111 is detected by the voltage detection B unit 2207. At this time, the relay contact 2209 (SW0) can be connected to the terminal (1) illustrated in FIG. 7. The central processing unit 2201 drives the voltage detection B unit 2207. Then, the power (V2) supplied from the second AC power supply 2111 is detected. The result is sent to the central processing unit 2201 by the voltage detection unit 2202.

Next, the central processing unit 2201 compares the voltages detected by the voltage detection A unit 2206 and the voltage detection B unit 2207. After comparing the voltages, the central processing unit 2201 uses the power with a higher voltage value as the operation power in the power receiving apparatus 2110.

Then, the central processing unit 2201 subtracts the voltage drop value V0 in the power receiving apparatus 2110 from the input voltage value V1, which is the input voltage of the power supplied via the power receiving apparatus 2103, and also from the input voltage V2, which is the input voltage from the second AC power supply 2111.

As described above, Va represents the voltage value which is obtained by subtracting the voltage drop value V0 in the power receiving apparatus 2110 from the input voltage value V1, which is the input voltage value of the power supplied from the power receiving apparatus 2103. Vb represents the voltage value which is calculated by subtracting the voltage drop value V0 in the power receiving apparatus 2110 from the input voltage value V2, which is the input voltage from the second AC power supply 2111. These values are stored in the memory 2203. The voltage values Va and Vb can be considered as an output voltage at the voltage measuring point 2211. Based on these calculated values, power supplied to the downstream apparatuses can be selected.

Next, operations regarding the power supplied to the downstream apparatuses and the power used in the receiving apparatus 2110 will be described referring to the level (i.e., high or low) of each voltage value. In step S2308, the central processing unit 2201 determines the relationships among the voltage values V1, V2, Va, and Vb stored in the memory 2203.

Figure 9A:
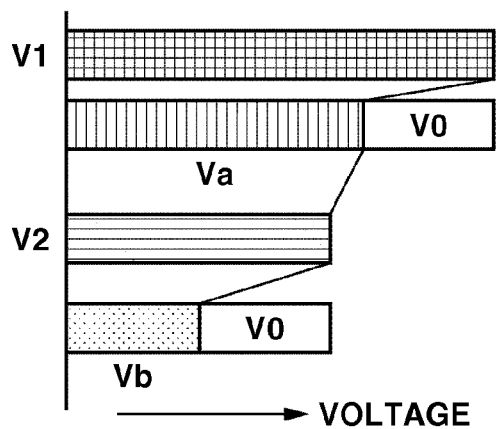
FIGS. 9A through 9D are graphs each illustrating a voltage value of power supplied from an upstream apparatus, a voltage value obtained by subtracting a voltage drop value in the power receiving apparatus from the voltage value of the power supplied from the upstream apparatus, a voltage of power supplied from the second AC power supply, and a voltage value obtained by subtracting a voltage drop value in the power receiving apparatus from the voltage value of the power supplied from the second AC power supply.

In step S2309, if V1 is higher than V2, and Va is higher than V2, as illustrated in FIG. 9A, the central processing unit 2201 uses the power with the voltage value V1 as the power for the power receiving apparatus 2110 and supplies the power with the output voltage Va to the downstream apparatus. This is a case where the input voltage value V1 of the power supplied from the power receiving apparatus 2103 is higher than the input voltage V2 of the second AC power supply 2111, and even if the voltage drop value V0 in the power receiving apparatus 2110 is subtracted from the input voltage value V1, the obtained value is higher than the input voltage value V2 of the power supplied from the second AC power supply 2111. When the power to be supplied is determined, the process proceeds to step S2310. In step S2310, the central processing unit 2201 connects each of the terminals (1) of the relay contacts 2209 (SW0) and 2210 (SW1) In this way, both the voltages of the power used in the power receiving apparatus 2110 (V1) and of the power supplied to the downstream apparatus (V1−V0=Va) can be high.

Figure 10A:
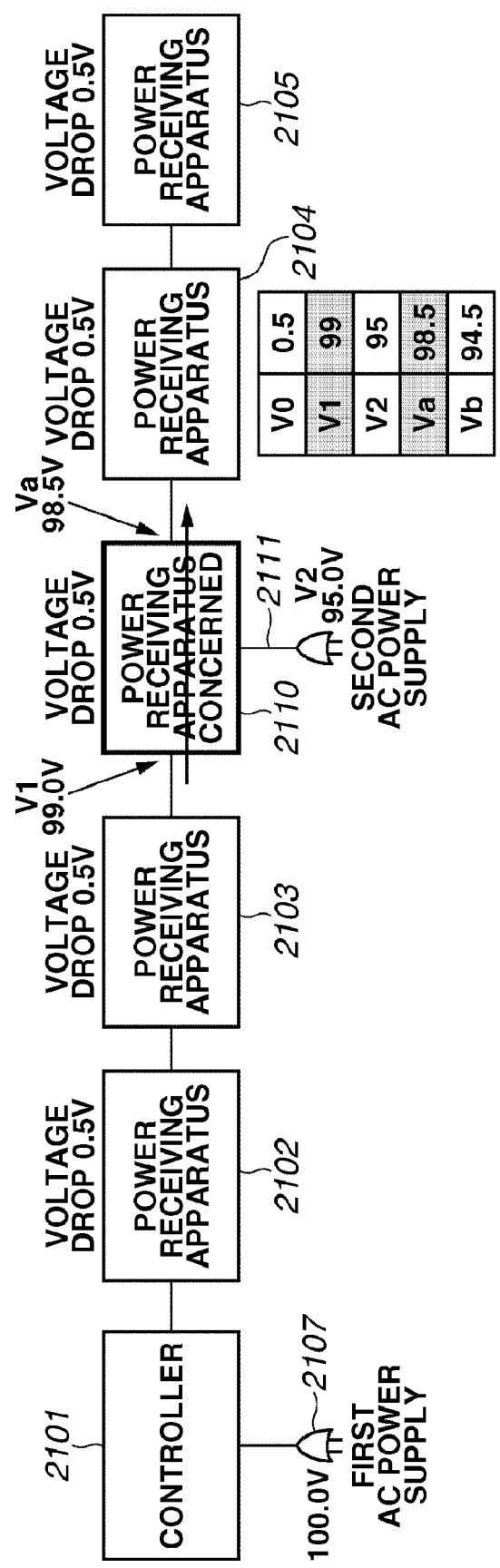

The supply of power in the case illustrated in FIG. 9A will be described referring to FIG. 10A. The voltage values illustrated in FIG. 10A are examples. In FIG. 10A, the voltage of power supplied from the first AC power supply 2107 connected to the controller 2101 is 100 V. The voltage of the supplied power drops in the power receiving apparatuses 2102 and 2103, which are connected to the power receiving apparatus 2110 in a daisy chain connection. Accordingly, the voltage of the power supplied from the power receiving apparatus 2103 to the power receiving apparatus 2110 is 99 V. Thus, the input voltage value V1 is 99 V.

On the other hand, the voltage value of the power supplied from the second AC power supply 2111 connected to the power receiving apparatus 2110 is 95V. Thus, the input voltage value V2 is 95 V. Since the voltage drop value V0 in the power receiving apparatus 2110 is 0.5 V, the output voltage value Va is 98.5 V and the output voltage Vb is 94.5 V. Thus, the input voltage value V1 is used as the operation voltage of the power used in the power receiving apparatus 2110 and the output voltage value Va is used as the voltage of the power supplied to the downstream apparatus.

Figure 9B:
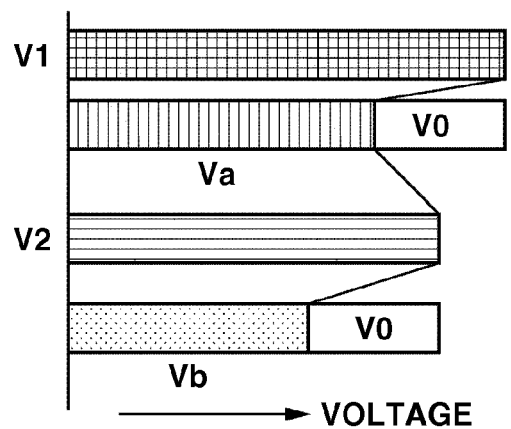

In step S2311, if V1 is higher than V2, and V2 is higher than Va, as illustrated in FIG. 9B, the central processing unit 2201 uses power with the input voltage value V1 as the power for the power receiving apparatus 2110 and supplies power with the input voltage value V2 to the downstream apparatus. This is a case where the input voltage value V1 of the power supplied from the power receiving apparatus 2103 is higher than the input voltage V2 of the power supplied from the second AC power supply 2111, and if the voltage drop value V0 in the power receiving apparatus 2110 is subtracted from the input voltage value V1, the obtained value is lower than the input voltage value V2 of the power supplied from the second AC power supply 2111. When the power to be supplied is determined, the process proceeds to step S2312. In step S2312, the central processing unit 2201 connects the terminal (1) of relay contact 2209 (SW0) and the terminal (2) of the relay contact 2210 (SW1). In this way, both the voltages of power used in the power receiving apparatus 2110 (V1) and of the power supplied to the downstream apparatus (V2) can be high.

Figure 10B:
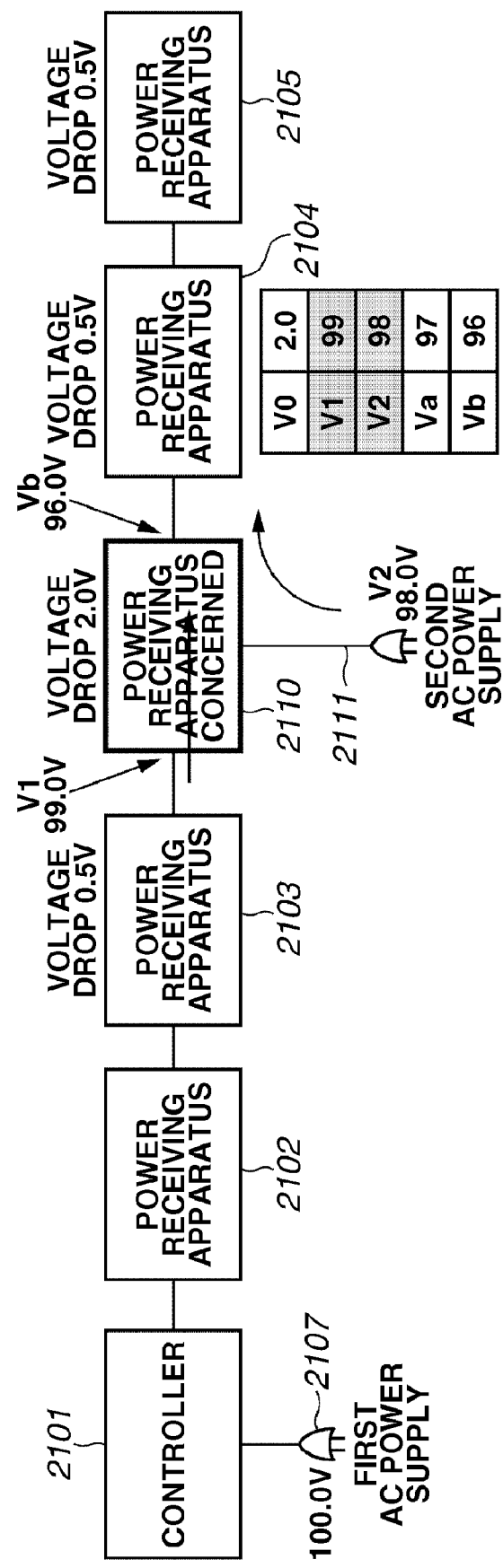

The supply of power in the case illustrated in FIG. 9B will be described referring to FIG. 10B. The voltage values illustrated in FIG. 10B are examples. In FIG. 10B, the voltage of power supplied from the first AC power supply 2107 connected to the controller 2101 is 100 V. The voltage of the supplied power drops in the power receiving apparatuses 2102 and 2103, which are connected to the power receiving apparatus 2110 in a daisy chain connection. Accordingly, the voltage of the power supplied from the power receiving apparatus 2103 to the power receiving apparatus 2110 is 99 V. Thus, the input voltage value V1 is 99 V.

On the other hand, the voltage value of the power supplied from the second AC power supply 2111 connected to the power receiving apparatus 2110 is 98 V. Thus, the input voltage value V2 is 98 V. Since the voltage drop value V0 in the power receiving apparatus 2110 is 2.0 V, the output voltage value Va is be 97V and the output voltage Vb is 96 V. Thus, the input voltage value V1 is used as the operation voltage of the power used in the power receiving apparatus 2110 and the output voltage value V2 is used as the voltage of the power supplied to the downstream apparatus.

Figure 9C:
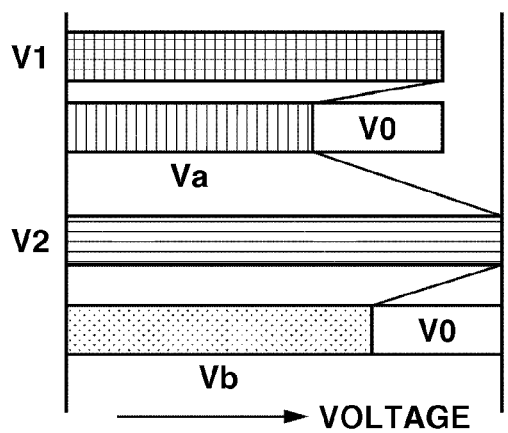

In step S2313, if V2 is higher than V1, and V1 is higher than Vb, as illustrated in FIG. 9C, the central processing unit 2201 uses power with the input voltage V2 as the power for the power receiving apparatus 2110 and supplies power with the input voltage value V1 to the downstream apparatus. This is a case where the input voltage value V1 of the power supplied from the power receiving apparatus 2103 is lower than the input voltage V2 of the second AC power supply 2111, and if the voltage drop value V0 in the power receiving apparatus 2110 is subtracted from the input voltage value V2, the obtained value is lower than the input voltage value V1. When the power to be supplied is determined, the process proceeds to step S2314. In step S2314, the central processing unit 2201 connects the terminal (2) of the relay contact 2209 (SW0) and the terminal (1) of the relay contact 2210 (SW1). In this way, both the voltages of power used in the power receiving apparatus 2110 (V2) and of the power supplied to the downstream apparatus (V1) can be high.

Figure 10C:
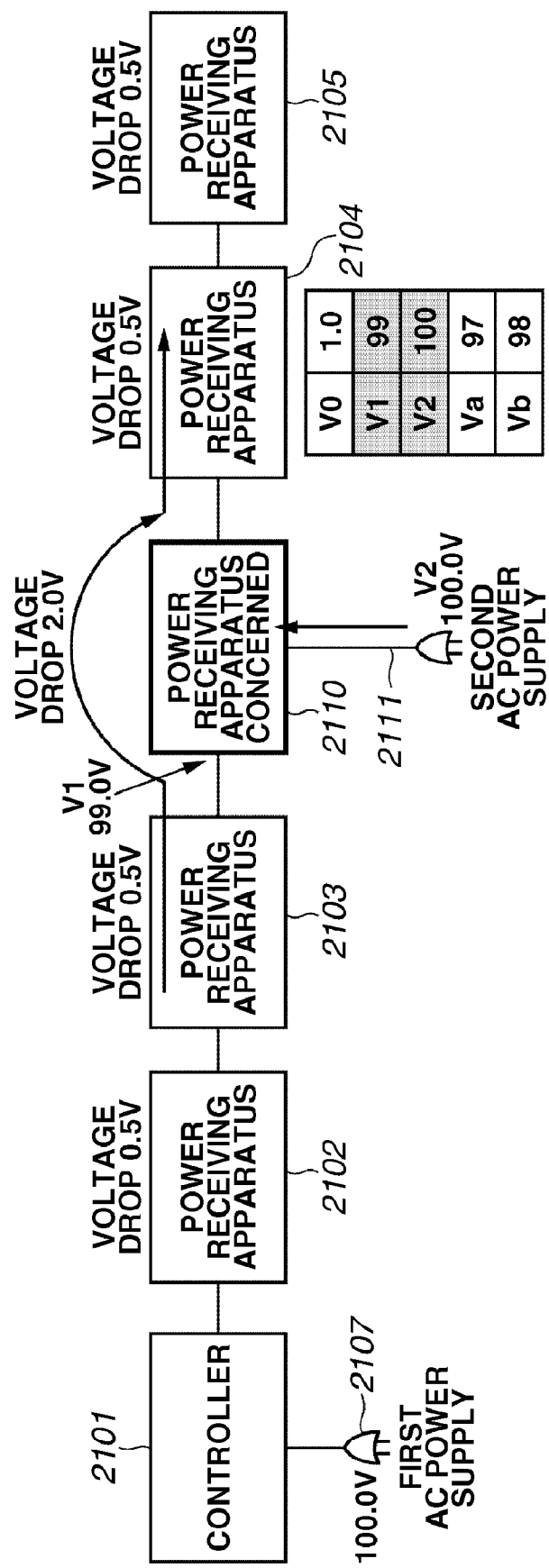

The supply of power in the case illustrated in FIG. 9C will be described referring to FIG. 10C. The voltage values illustrated in FIG. 10C are examples. In FIG. 10C, the voltage of power supplied from the first AC power supply 2107 connected to the controller 2101 is 100 V. The voltage of the supplied power drops in the power receiving apparatuses 2102 and 2103, which are connected to the power receiving apparatus 2110 in a daisy chain connection. Accordingly, the voltage of the power supplied from the power receiving apparatus 2103 to the power receiving apparatus 2110 is 99 V. Thus, the input voltage value V1 is 99 V.

On the other hand, the voltage value of the power supplied from the second AC power supply 2111 connected to the power receiving apparatus 2110 is 100 V. Thus, the input voltage value V2 is 100 V. Since the voltage drop value V0 in the power receiving apparatus 2110 is 2.0 V, the output voltage value Va is 97 V and the output voltage Vb is 98 V. Thus, the input voltage value V2 is used as the operation voltage of the power used in the power receiving apparatus 2110 and the input voltage value V1 is used as the voltage of the power supplied to the downstream apparatus.

Figure 9D:
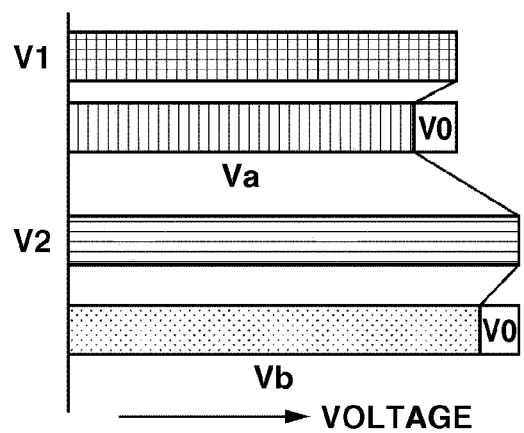

In step S2315, if V2 is higher than V1, and Vb is higher than V1, as illustrated in FIG. 9D, the central processing unit 2201 uses power having the voltage value V2 as the power for the power receiving apparatus 2110 and supplies power with the voltage Vb to the downstream apparatus. This is a case where the input voltage value V1 of the power supplied from the power receiving apparatus 2103 is lower than the voltage value V2 of the power supplied from the second AC power supply 2111, and the input voltage value V1 is lower than the output voltage value Vb, which is the voltage value obtained by subtracting the voltage drop value V0 in the power receiving apparatus 2110 from the voltage value V2. When the power to be supplied is determined, the process proceeds to step S2316. In step S2316, the central processing unit 2201 connects each of the terminals (2) of the relay contacts 2209 (SW0) and 2210 (SW1). In this way, both the voltages of the power used in the power receiving apparatus 2110 (V2) and of the power supplied to the downstream apparatus (Vb) can be high.

The supply of power in the case illustrated in FIG. 9D will be described referring to FIG. 10D. The voltage values illustrated in FIG. 10D are examples. In FIG. 10D, the voltage of power supplied from the first AC power supply 2107 connected to the controller 2101 is 99 V. The voltage of the supplied power drops in the power receiving apparatuses 2102 and 2103, which are connected to the power receiving apparatus 2110 in a daisy chain connection. Accordingly, the voltage of the power supplied from the power receiving apparatus 2103 to the power receiving apparatus 2110 is 98 V. Thus, the input voltage value V1 is 98 V.

On the other hand, the voltage value of the power supplied from the second AC power supply 2111 connected to the power receiving apparatus 2110 is 99 V. Thus, the input voltage value V2 is 99 V. Since the voltage drop value V0 in the power receiving apparatus 2110 is 0.5 V, the output voltage value Va is 97.5 V and the output voltage Vb is 98.5 V. Thus, the input voltage value V2 is used as the operation voltage of the power used in the power receiving apparatus 2110 and the output voltage value Vb is used as the voltage of the power supplied to the downstream apparatus.

Although supplied power having a higher voltage is used in the power receiving apparatus 2110 in the above-described examples, using power having a lower voltage in the power receiving apparatus 2110 and supplying power having a lower voltage to the downstream apparatus can be also realized by a configuration and operation procedures similar to those described in the present exemplary embodiment.

Further, according to the above-described exemplary embodiments, voltage is detected at the start-up time of the system. However, the voltage detection can be performed in real time. In that case, it is possible to respond to changes including voltage change and change in current consumption of upstream apparatuses in a flexible manner.

According to the above-described exemplary embodiment, power having a higher voltage out of power supplied from a plurality of apparatuses via transmission lines, or power having a higher voltage out of power supplied from apparatuses via transmission lines and power supplied from an AC power supply, is used in the apparatus. Thus, optimum power considering voltage drop due to a long transmission line can be used, and overall operation of the system that uses transmission lines in supplying power becomes stable.

Further, if the currently-used power in the apparatus becomes low due to voltage drop and becomes lower than the power not currently used in the apparatus, the power is supplied to the downstream apparatus without passing through the power consumption system in the apparatus. Since power that is unaffected by the voltage drop can be supplied to the downstream apparatus, the downstream apparatus can perform stable operation.

Process of each unit that configures the above-described embodiments can be realized by executing a program stored in a RAM or a ROM of a computer. The program and a computer-readable storage medium storing the program are included in the present invention.

The above-described exemplary embodiments can be also realized with, for example, a system, an apparatus, a method, a program, or a computer-readable storage medium. More specifically, the above-described exemplary embodiments can be applied to an apparatus including a single device.

The above-described exemplary embodiments can also be achieved by supplying a software program that realizes each function of the aforementioned exemplary embodiments, directly or by remote operation, to the system or the apparatus and a computer included in the system or the apparatus reading out and executing the provided program code.

Accordingly, the program code which is installed in and executed by the computer to realize the functions of the exemplary embodiments of the present invention also configures the present invention. In other words, the present invention includes a computer-executable program configured to realize the processing of the functions of the above-described exemplary embodiments. In this case, the computer-executable program can be provided in the form of object code, a program executed by an interpreter, or script data supplied to an operating system (OS), etc., if it functions as a program.

The functions of the above-described exemplary embodiments are implemented when the provided program is executed by a computer. Additionally, an OS running on a computer can realize the functions of the above-described exemplary embodiments by performing the whole or a part of the actual processing based on an instruction of the program.

Further, a program read out from a computer-readable storage medium can be written in a memory provided in a function expansion board of a computer or a function expansion unit connected to the computer. Based on an instruction of the program, a CPU of the function expansion board or the function expansion unit can execute the whole or a part of the actual processing. The functions of the aforementioned exemplary embodiments can be realized in this manner.

According to the above-described exemplary embodiments, power having a higher voltage out of power supplied from a plurality of external apparatuses via transmission lines, or power having a higher voltage out of power supplied from external apparatuses via transmission lines and power supplied from an AC power supply, is used in the apparatus. Thus the supply source of the power used in the apparatus can be appropriately selected, and overall operation of the system that uses transmission lines in supplying power becomes stable.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-098599 filed Apr. 4, 2008, which is hereby incorporated by reference herein in its entirety.

What is claimed is:

1. An information processing apparatus comprising:
 a first connector configured to receive power from a power supply;
 a second connector configured to receive power from another information processing apparatus and supply power to the other information processing apparatus;
 a first comparison unit configured to compare a voltage value of a power received via the first connector and a voltage value of a power received via the second connector;
 a control unit configured to use one of the power received via the first connector and the power received via the second connector within the information processing apparatus according to a result of a comparison made by the first comparison unit; and
 a power supply unit configured to supply the power determined to have a higher voltage to the other information processing apparatus via the second connector, if the power received via the first connector is higher than the power received via the second connector.

2. The information processing apparatus according to claim 1, further comprising:
 a request unit configured to request the other information processing apparatus to stop supplying power if, as a result of the comparison made by the first comparison unit, the voltage value of the power received via the first connector is determined to be higher than the voltage value of the power received from the other information processing apparatus via the second connector,
 wherein the power supply unit supply supplies the power received via the first connector to the other information processing apparatus, if the voltage value of the power received via the first connector is determined to be higher than the voltage value of the power received from the other information processing apparatus via the second connector.

3. The information processing apparatus according to claim 1, further comprising:
 a determination unit configured to determine a value of voltage drop caused by use of power within the information processing apparatus; and a second comparison unit configured to compare a value obtained by subtracting the value of voltage drop determined by the determination unit from a voltage value of power used within the information processing apparatus by the control of the control unit with a voltage value of power not used within the information processing apparatus, wherein the power supply unit supplies one of the power used within the information processing apparatus and the power not used within the information processing apparatus to the other information processing apparatus based on a result of a comparison made by the second comparison unit.

4. The information processing apparatus according to claim 3, wherein, if the value obtained by subtracting the value of voltage drop determined by the determination unit from the voltage value of power used within the information processing apparatus is lower than the voltage value of power not used within the information processing apparatus as a result of the comparison made by the second comparison unit, the power supply unit supplies the power not used within the information processing apparatus to the other information processing apparatus not via a power consumption system within the information processing apparatus.

5. A first information processing apparatus comprising:
a first connector configured to receive power from a second information processing apparatus and supply power to the second information processing apparatus;
a second connector configured to receive power from a third information processing apparatus and supply power to the third information processing apparatus;
a first comparison unit configured to compare a voltage value of a power received via the first connector and a voltage value of a power received via the second connector;
a control unit configured to use one of the power received via the first connector and the power received via the second connector within the first information processing apparatus according to a result of a comparison made by the first comparison unit; and
a power supply unit configured to supply the power received via the first connector to the third information processing apparatus or supply the power received via the second connector to the second information processing apparatus, according to a result of a comparison made by the first comparison unit.

6. The first information processing apparatus according to claim 5, further comprising:
a second comparison unit configured to compare a voltage value of a power used within the first information processing apparatus by control of the control unit with a voltage value of a power not used within the first information processing apparatus; and
a request unit configured to request an information processing apparatus supplying power not used within the first information processing apparatus to stop supplying power if, as a result of a comparison made by the second comparison unit, the voltage value of the power not used within the first information processing apparatus is determined to be higher than the voltage value of the power used within the first information processing apparatus by a predetermined value or more, wherein the power supply unit starts supplying power to the information processing apparatus which stopped supplying power.

7. The first information processing apparatus according to claim 6, wherein the second comparison unit performs the comparison using a value obtained by considering a value of voltage drop within the first information processing apparatus as the voltage value of the power not used within the first information processing apparatus.

8. A method for controlling an information processing apparatus including a first connector configured to receive power from a power supply and a second connector configured to receive power from another information processing apparatus and supply power to the other information processing apparatus, the method comprising:
comparing a voltage value of a power received via the first connector and a voltage value of a power received via the second connector;
using one of the power received via the first connector and the power received via the second connector within the information processing apparatus according to a result of the comparison in the comparing step; and
supplying the power determined to have a higher voltage to the other information processing apparatus via the second connector, if the power received via the first connector is higher than the power received via the second connector.

9. A method for controlling a first information processing apparatus including a first connector configured to receive power from a second information processing apparatus and supply power to the second information processing apparatus and a second connector configured to receive power from a third information processing apparatus and supply power to the third information processing apparatus, the method comprising:
comparing a voltage value of a power received via the first connector and a voltage value of a power received via the second connector;
using one of the power received via the first connector and the power received via the second connector within the first information processing apparatus according to a result of the comparison in the comparing step; and
supplying the power received via the first connector to the third information processing apparatus or supplying the power received via the second connector to the second information processing apparatus, according to a result of the comparison in the comparing step.

* * * * *